US008011882B2

(12) United States Patent
McMillan

(10) Patent No.: US 8,011,882 B2
(45) Date of Patent: Sep. 6, 2011

(54) VANE ASSEMBLY

(75) Inventor: Alison J. McMillan, Uttoxeter (GB)

(73) Assignee: Rolls-Royce Plc, London (GB)

( * ) Notice: Subject to any disclaimer, the term of this patent is extended or adjusted under 35 U.S.C. 154(b) by 1012 days.

(21) Appl. No.: 11/509,691

(22) Filed: Aug. 25, 2006

(65) Prior Publication Data
US 2007/0110583 A1 May 17, 2007

(30) Foreign Application Priority Data

Sep. 24, 2005 (GB) .................... 0519502.9

(51) Int. Cl.
*F01D 17/16* (2006.01)

(52) U.S. Cl. ........ 415/148; 415/156; 415/157; 415/159; 415/160; 416/132 A; 416/136; 416/138; 416/229 A; 416/230; 416/240; 416/241 A; 416/242

(58) Field of Classification Search .................. 415/148, 415/156, 157, 158, 159–161; 416/132 A, 416/136, 138, 229 R, 229 A, 230, 240, 241 A, 416/242
See application file for complete search history.

(56) References Cited

U.S. PATENT DOCUMENTS

| 1,984,044 | A | * | 12/1934 | Sukohl | 416/229 R |
|---|---|---|---|---|---|
| 2,477,375 | A | * | 7/1949 | Jablonsky | 416/229 R |
| 2,614,747 | A | * | 10/1952 | Christensen | 415/156 |
| 2,934,317 | A | * | 4/1960 | Warnken | 416/230 |
| 3,614,260 | A | | 10/1971 | Ellinger | |
| 3,674,379 | A | * | 7/1972 | Monti | 416/230 |
| 3,723,021 | A | | 3/1973 | Bartholomew | |
| 4,037,988 | A | * | 7/1977 | Laird | 416/132 A |
| 4,619,580 | A | | 10/1986 | Snyder | |
| 4,821,758 | A | | 4/1989 | Ruis | |
| 5,672,417 | A | * | 9/1997 | Champenois et al. | 416/230 |
| 6,076,776 | A | | 6/2000 | Breitbach et al. | |
| 6,419,187 | B1 | | 7/2002 | Buter et al. | |
| 2006/0120874 | A1 | * | 6/2006 | Burke et al. | 416/229 R |

FOREIGN PATENT DOCUMENTS

GB 2 348 537 A 10/2000
GB 2 372 296 A 8/2002

* cited by examiner

*Primary Examiner* — Christopher Verdier
(74) *Attorney, Agent, or Firm* — Oliff & Berridge, PLC

(57) ABSTRACT

A vane assembly for a gas turbine engine, the assembly including a plurality of vanes 14 with an asymmetric organic metal/ceramic matrix composite lay up, such that when the vanes 14 are placed in tension or compression the profile of the vane 14 will alter by twisting or untwisting. Other materials may be provided for the vanes 14, and/or other methods may be used for placing the vanes 14 in tension or compression to provide positive changes to the profile thereof.

26 Claims, 6 Drawing Sheets

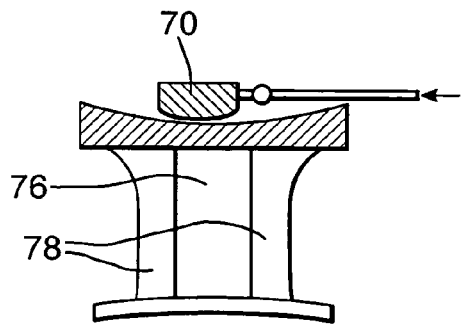
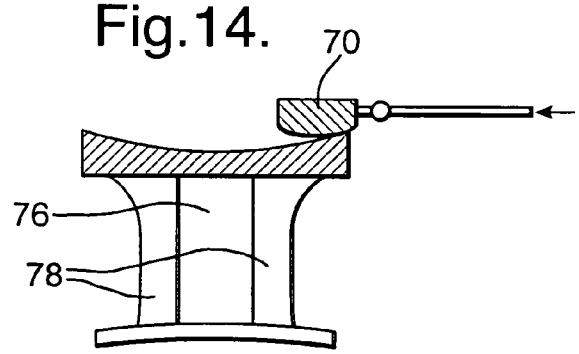
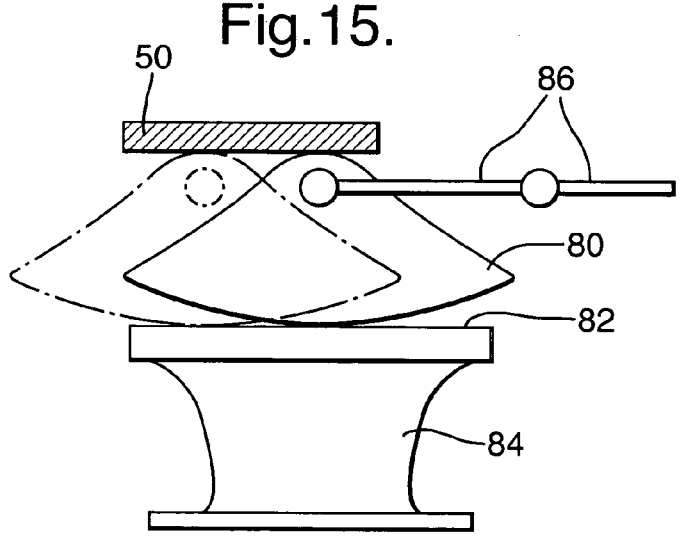
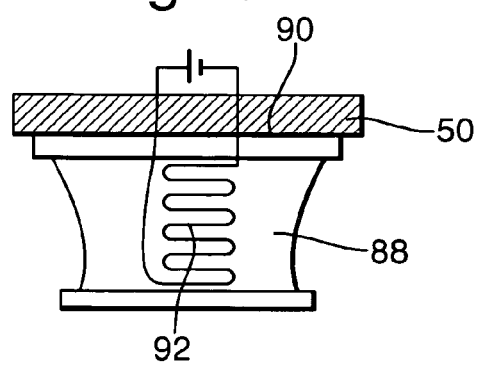

VANE ASSEMBLY

This invention concerns improvements in or relating to vane assemblies for gas turbine engines, compressors for gas turbine engines, and turbines for gas turbine engines and in particular to variable vane assemblies for gas turbine engines.

It is known to vary the inclination, or angle, of guide vanes in a variable guide vane assembly of a compressor of gas turbine engine as used for instance in an aircraft. This variation of the inclination of the guide vanes can be used to adjust the amount of gas flow straightening in different parts of the flight cycle. This provides for increased compressor efficiency, and thus without this feature compressor efficiency can be significantly reduced.

One way of achieving this is to pivotally mount the vanes in the annulus, and provide a mechanism for rotating the vanes. This arrangement is however disadvantageous for a number of reasons. A relatively complex design is required to achieve the selected rotation. This thus requires a significant amount of assembly time with the use of a number of additional components. The relatively complex design can provide problems with reliability, and also provides for added weight and cost.

An alternative approach has been to provide vanes made of layers or otherwise of materials of different thermal characteristics, such that the heat from the gases passing the vanes causes deflection thereof. Such a system is obviously dependent on gas temperatures, which need not be specific to different parts of the flight cycle. Such a system has a built in delay to await heating of the gases and subsequent heating and thus deflecting of the vanes. This system is not controllable in use, and can only be set to a particular expected mode of operation.

The term "snap-through" is to be understood in this specification as defining a phenomenon in geometrically non-linear elasticity. With snap-through an article has a first stress stable state and can be moved by the application of force to a second stress stable state of tension or compression, and will generally remain in either stress state due to the greater force required to urge the article between either stable state.

According to the present invention there is provided a vane assembly for a gas turbine engine, the assembly including a plurality of vanes, with at least some of the vanes configured such that when the conditions encountered by the vanes are positively varied, the profile of the vanes will alter, the vanes are made of layers of a composite material, with the layers of the composite material arranged in an asymmetric pattern relative to a mid plane of the vanes such that the vanes have asymmetric mechanical characteristics, means to apply radial tension or radial compression to the vanes such that the profile of the vanes will alter.

Fibres in the respective layers of the composite material may be provided in an asymmetric pattern. For instance the fibres in the respective layers may be generally inclined relative to a longitudinal axis of the vane. Some of the layers in the composite material may only extend for part of the length thereof.

The vanes may be made of any of organic matrix composite; metal matrix composite; ceramic matrix composite; laminate with layers of different materials; metallic material with sections of different metals; or a prestressed metal.

The vane assembly may include urging means for placing some of the vanes therein under radial tension or radial compression.

The urging means may comprise force application means for directly physically placing each vane under radial compression or radial tension. The force application means could include a plurality of individual piston and cylinder units.

The urging means may include shape memory alloy wires within the vanes such that to actuate the urging means, an electric current is supplied to the shape memory alloy wires causing the wires to heat, and when the actuation temperature is reached a radial compression or radial tension force is applied thereby to the vanes.

Inner and outer mounting rings may be provided between which the vanes extend, and one or both of said rings may be provided with a significantly different thermal coefficient of expansion to the vanes, such that heating up of the rings and vanes will cause radial compression or radial tension force to be applied to the vanes, causing the profile thereof to vary.

Only a generally central portion of the vanes may be mounted to the rings, with the leading and trailing edges of the vanes being clear of the rings.

The vanes may have asymmetric thermal mechanical characteristics.

One or more heating means may be provided in the vanes, such that actuation of the heating means causes the profile of the vanes to alter.

The heating means may be provided only in a selected area or areas of the vanes.

The heating means may be in the form of heating wires embedded in the vanes.

The vanes may be configured such that they can snap-through as hereinbefore defined between two varied stress profiles, and will remain in a one of the profiles until sufficient respective forces are applied to urge the vanes to the other profile.

The vanes may include a central stressed core which provides a snap-through characteristic for the vane.

The vanes may be arranged such that the force required to move the vanes to another profile can be provided in use by gas pressure loading in the compressor.

The invention still further provides a turbine for a gas turbine engine, the turbine including one or more vane assemblies according to any of the preceding nineteen paragraphs.

In an alternative arrangement the vanes of the assembly are usable as outlet guide vanes (OGV) behind the fan in a bypass duct.

The invention also provides a compressor for a gas turbine engine, the compressor including one or more vane assemblies according to any of said preceding nineteen paragraphs, or the above paragraph.

Embodiments of the present invention will now be described by way of example only and with reference to the accompanying drawings, in which:

FIGS. 12 to 14 are similar views to FIG. 10 but of a still further vane assembly according to the invention, in three different conditions;

FIG. 15 is a diagrammatic view similar view to FIG. 10 but of a yet further vane assembly according to the invention;

FIG. 16 is a similar view to FIG. 10 of another vane assembly according to the invention;

Figure 1:
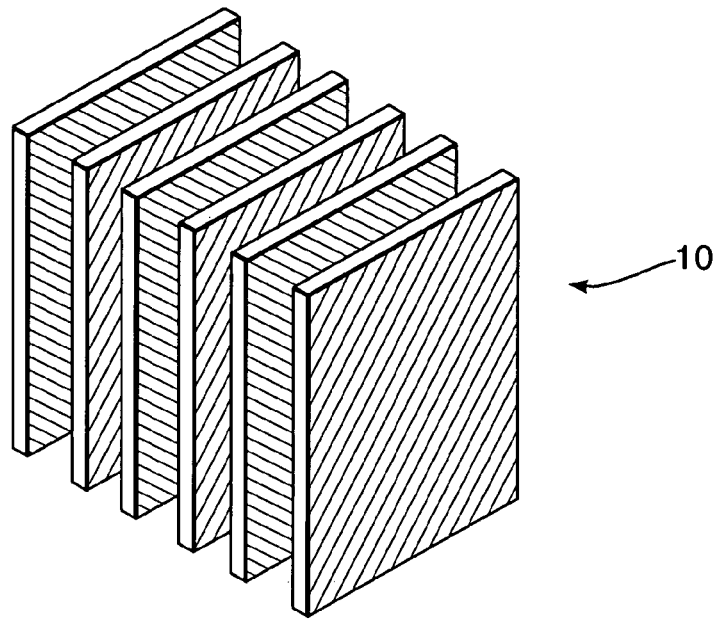
FIG. 1 is a diagrammatic view showing the make up of a component according to the invention.

FIG. 1 diagrammatically shows the layers of a composite block 10, which block could be profiled to form a compressor vane for a gas turbine engine. The general direction of the tow fibres is shown by the lines in FIG. 1. By avoiding a wholly symmetrical placement of the tows with respect to the midplane of the structure, the block 10 can be made to have asymmetrical mechanical characteristics about its longitudinal direction.

Figure 2:
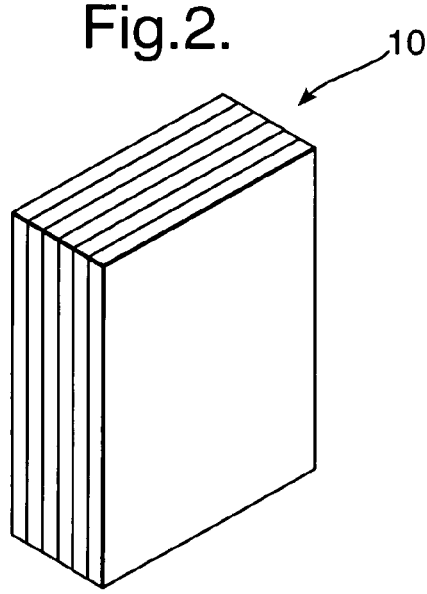
FIG. 2 is a diagrammatic perspective view of the component of FIG. 1 in an unstressed state.
Figure 3:
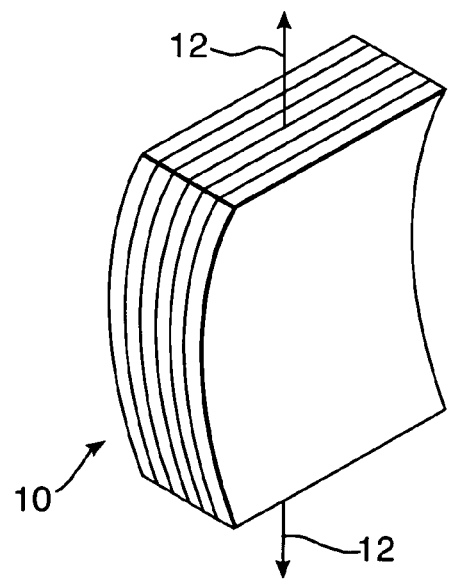
FIG. 3 is a similar view to FIG. 2 but with the component under tension.

FIG. 2 shows the block 10 at rest, whilst FIG. 3 shows the block 10 being put under tension, as is illustrated by the arrows 12. Due to the asymmetric layers of the tows, tension in the block 10 causes bending thereof as shown in FIG. 3. The block 10 is made of organic metal/ceramic matrix composites. The asymmetric effect is particularly strong in such composites, as a result of the large different elastic moduli between layers of the material oriented in the fibre direction and those perpendicular to the fibre direction.

Figure 4:
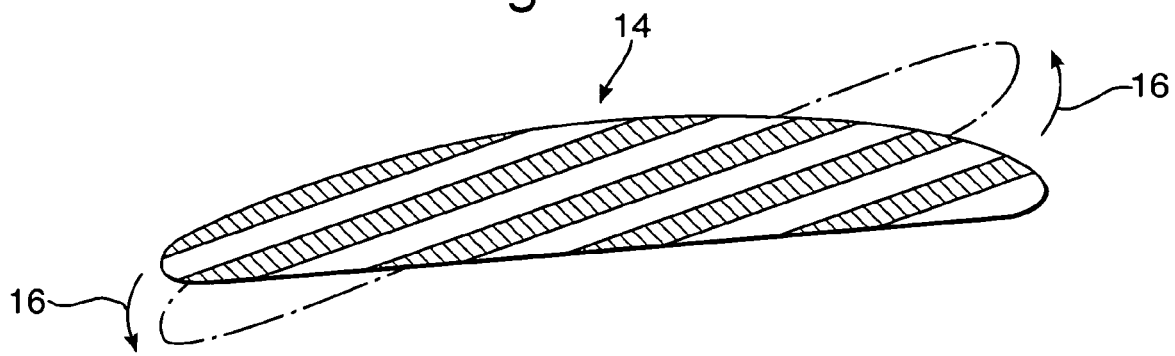
FIGS. 4 and 5 are diagrammatic cross sectional plan views through guide vanes according to the invention.

FIG. 4 shows a guide vane in the bypass duct of a gas turbine engine, with an asymmetric lay up which in practice causes the vane 14 to twist as shown by the dotted line and arrows 16 when placed in tension or compression. In this instance the layers of organic matrix composite have been laid up inclined relative to the width of the vane 14.

Figure 5:
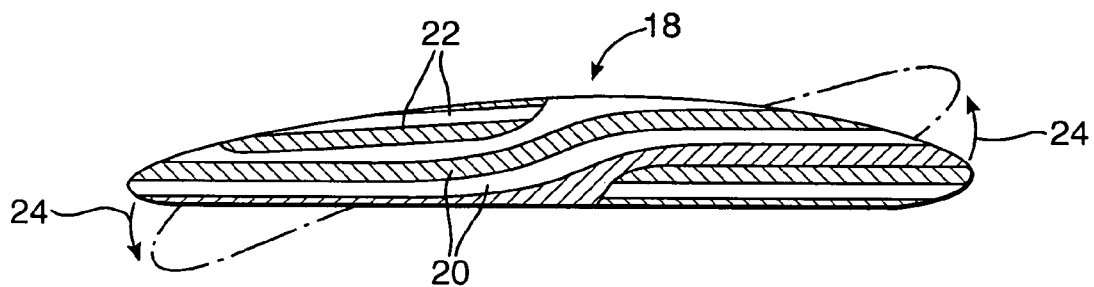
Figure 6:
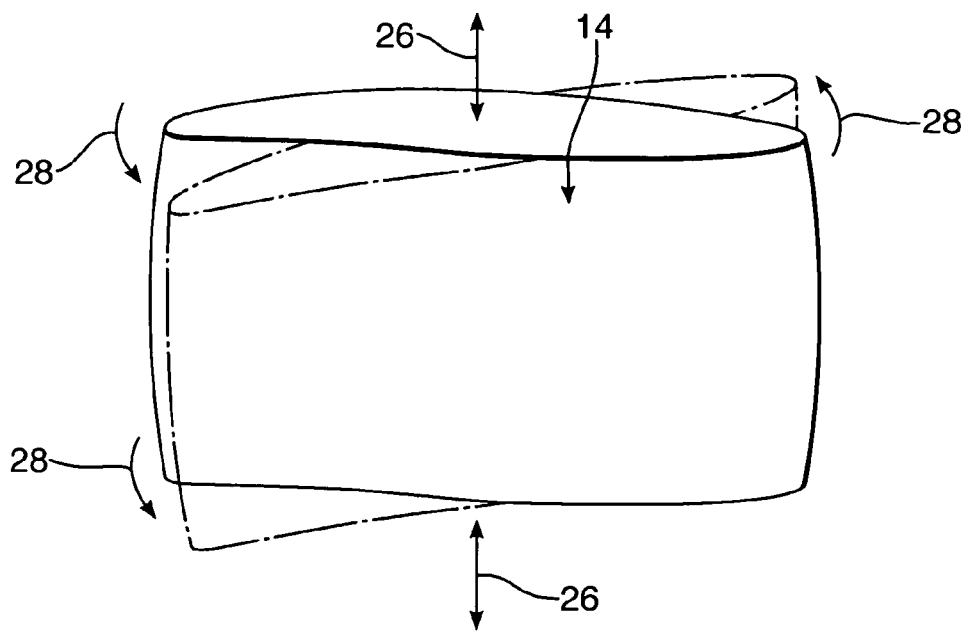
FIG. 6 is a diagrammatic perspective view showing the vane of FIG. 4 in use.

FIG. 5 shows a similar view to FIG. 4 of a vane 18. In this instance some of the layers 20 of organic matrix composite material extend wholly across the vane 18 in a shallow S configuration. Others of the layers 22 only extend from the edge to towards the centre of the vane 18. This configuration again leads to the vane 18 twisting when in tension or configuration, as shown by the arrows 24 and dotted lines. FIG. 6 shows the vane 14 under compression or tension illustrated by the arrows 26, and with the twist illustrated by dotted lines and the arrows 28.

Figure 7:
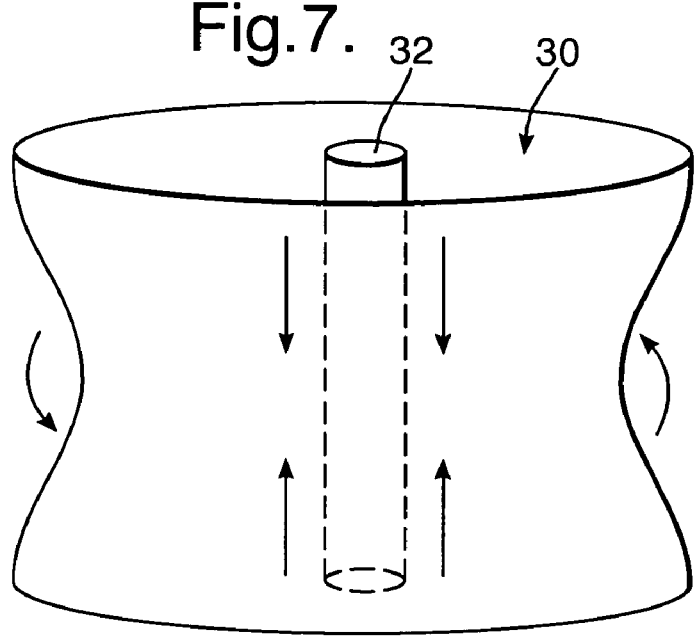
FIG. 7 is a diagrammatic perspective view of a further vane according to the invention.

FIG. 7 shows a further vane 30 according to the invention. In this instance the vane 30 has a snap-through arrangement between two positions, and an appropriate force will move the vane 30 to the other position where it will remain unless an appropriate reverse force is applied to urge it back to the original position.

The vane 30 is formed by providing a rod 32 or set of fibres as a mid cord of the vane 30. The rod 32 or set of fibres are introduced into the vane and held in tension during the curing process. This means that on cooling, through the mid cord of the vane, the material is in a state of residual stress producing a compression force on both sides of the cord. The sides will then buckle elastically inwards as shown.

By careful selection of the composite layers in the vane 30 it is possible for the leading edge half of the vane 30 to buckle one way, with the trailing edge buckling the other. Applying a tension force to the mid cord region and hence rod 32 would unbuckle the edges, and a small nudging force could flip the direction of the buckle the other way. In use the vane 30 may be arranged such that this nudging force could be derived from the gas pressure loading on the aerofoil.

Figure 8:
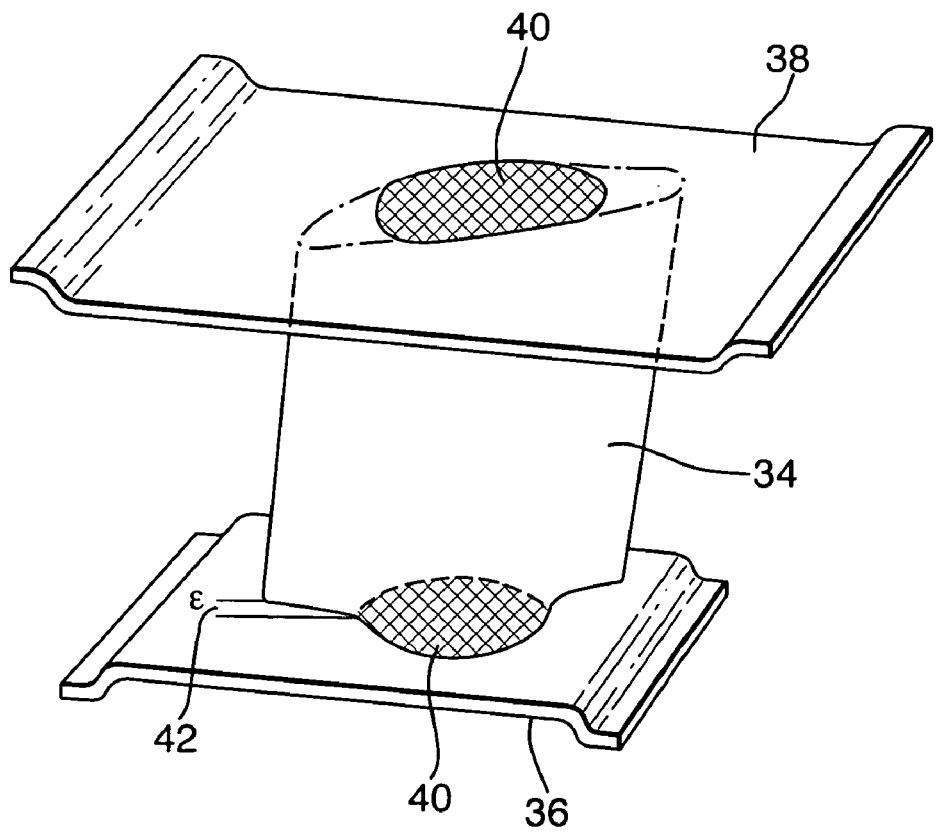
FIG. 8 is a diagrammatic perspective view of part of a compressor according to the invention.

FIG. 8 shows a vane 34 mounted between inner and outer rings 36, 38. The vane 34 can operate as per the vane 14 of FIG. 4 and thus its profile can change by applying radial compression or radial tension thereto. This could be achieved by providing the inner and/or outer rings 36, 38 with quite different coefficients of thermal expansion to the vane 34, such that as the engine heats up, this will cause a radial tension or radial compression to be applied by the rings 36, 38 to the vane 34.

As can be seen from FIG. 8, only a central portion 40 of the vane 34 is mounted to the rings 36, 38 with a clearance 42 provided between the leading and trailing edges of the vane 34 and the rings 36, 38. The ends of the vane 34 are mounted to the inner and outer platforms 36, 38. As the profile of the vane 34 changes, the profile of the leading and trailing edges in particular will alter. By not mounting these edges to the rings 36, 38 the possibility of significant fatigue occurring in the edges is avoided, thus permitting the leading and trailing edges to float freely relative to the rings 36, 38.

Figure 9:
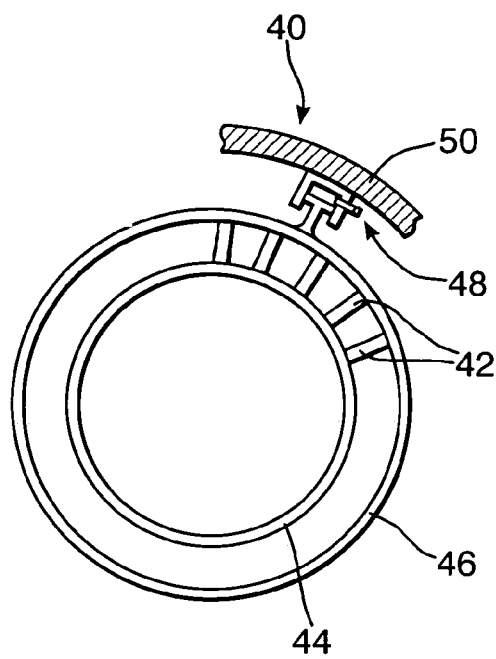
FIG. 9 is a diagrammatic axial view through part of a compressor according to the invention.
Figure 10:
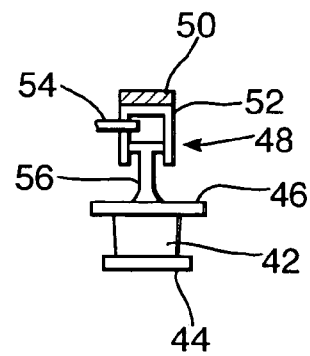
FIG. 10 is a sectional view through part of the compressor of FIG. 9.

FIGS. 9 and 10 show such an arrangement in a compressor 40. Here a plurality of vanes 42 are provided radially between the inner and outer rings 44, 46. Outside of the outer ring 46 a plurality of piston and cylinder units 48 are provided, though only one is shown in the drawings for clarity. The units 48 are engageable between the outer ring 46 and a solid stiff ring 50, each unit 48 comprises a cylinder 52 with a fluid inlet 54, and a piston 56 engageable against the outer ring 46 to urge the vanes 42 into a different shape if required by applying radial tension or radial compression to the vanes 42.

Figure 11:
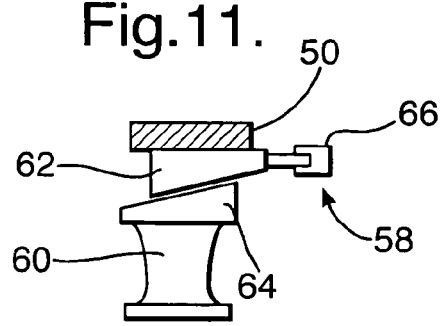
FIG. 11 is a similar view to FIG. 10 but of part of a further vane assembly according to the invention.

FIG. 11 shows an alternative unit 58 for applying force to a plurality of vanes 60. Here a wedge 62 is provided between the upper face 64 of the vane 60 and the stiff ring 50. A small piston and cylinder unit 66 is attached laterally to the wedge 62 for moving this axially relative to the vane 60. The upper part 64 of the vane 60 is also inclined such that counteraction between the upper surface 64 and wedge 62 causes radial compression or radial tension on the vane 60, and hence a required change of shape.

Figure 12:
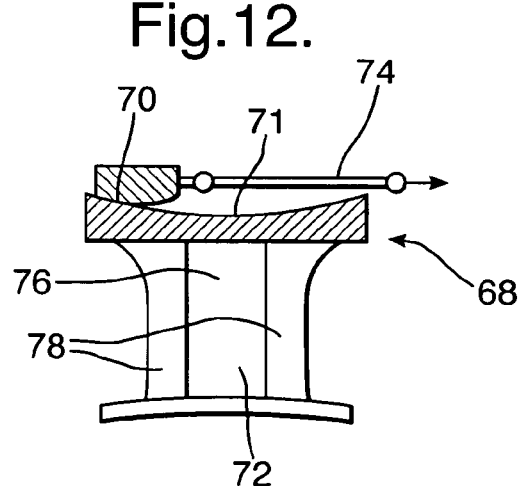

FIGS. 12 to 14 shows a still further unit 68 with an engagement member 70 with rounded edges which locates on the outer concave surface 71 of a vane 72. The engagement member 70 is provided on the end of a linkage 74 which connects to a piston and cylinder unit (not shown) or other actuator means, for moving the linkage 74 and hence member 70 in a required lateral direction as shown in the drawings.

In this instance the vane 72 has a central compressed region 76 and less stressed outer region 78. In FIG. 12 the engagement member 70 is engageable with the outer surface 71 of the left hand side outer region 78, and this radially compresses the vane 72 and causes an elastic buckling, flipping one side 78 out of the page as shown in the drawings, and the other side 78 into the page. In FIG. 13 the engagement member 70 is substantially central relative to the vane 72, and the stress release causes the sides 78 to relax. In FIG. 14 the engagement member 70 has been moved to the right as shown in the drawings and this again radially compresses the vane 72 causing it to flip the other way round relative to the position shown in FIG. 12.

FIG. 15 shows a still further arrangement where a further engagement member 80 engages against the top surface 82 as shown in the drawing, of a vane 84. The engagement member 80 also contacts the inside of the stiff ring 50. The engagement member 80 is pivotally connected by pivotal links 86 to an appropriate piston and cylinder system (not shown). This provides a rolling pressure from one side of the vane 84 to the other. This provides a change in the load, radial compression or radial tension, in the centre of the vane 84, and activates a snap through change in the vane 84.

FIG. 16 shows a further snap through vane 88 with the outer face 90 thereof engaging directly against the stiff ring 50. In this instance a heating element 92 is provided within the vane 88, and activation of the heating element causes the vane 88 to snap between the respective stress stable positions due to radial compression or radial tension in the vane 88.

Figure 17:
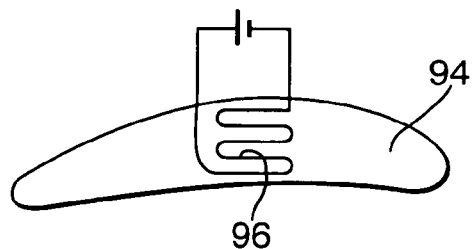
FIG. 17 is a generally similar view to FIG. 16 but of a different vane assembly according to the invention.

FIG. 17 shows a vane 94 with a heating element 96 located in the central region only thereof. Actuation of the element 96 causes the central part of the vane 94 to expand, which permits the leading and trailing edges to straighten and snap through to a stress stable position.

Figure 18:
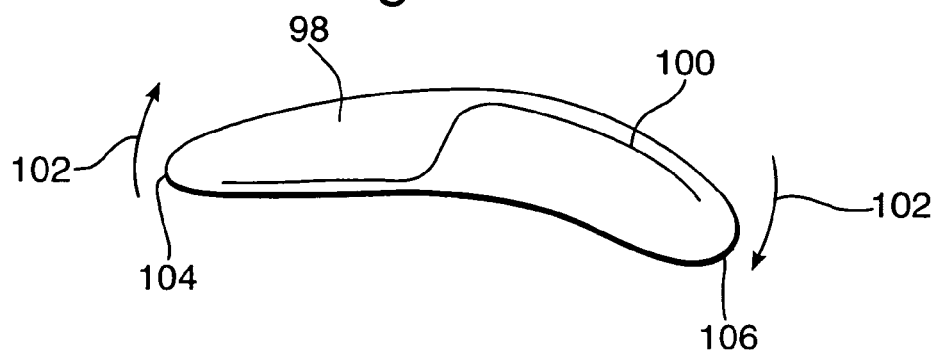
FIG. 18 is a diagrammatic cross sectional plan view of a yet further vane according to the invention.
Figure 19:
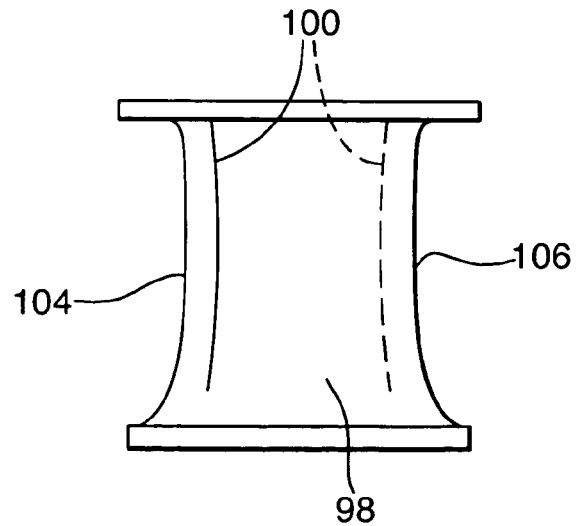
FIG. 19 is a similar view to FIG. 10 of the vane of FIG. 18.

A similar arrangement is shown in FIGS. 18 and 19 where a vane 98 is provided with a heat memory alloy wire 100 therein. The wire 100 has a generally S shaped configuration in a cross sectional plan view as shown in FIG. 18. As the wire 100 expands during heating when electricity is applied, this expansion causes the wire 100 to tend to straighten and the vane tips/edges 104, 106 to move as per the arrows 102 illustrated. When viewed as in FIG. 19, the expansion of the wire 100 causes the left edge 104 of the vane 98 as shown in FIG. 19 which is the front side, to tend to buckle into the page of the picture, and the right edge 106 the rear side, to tend to buckle out of the page.

With heat memory alloy located in each vane, when current is applied and the actuation temperature is reached, a consistent compressive or tension force will be applied to the vane. When the current is turned off the wire will cool down consistently and the force will be relieved.

There are thus described a number of embodiments of the invention which permit the inclination, or angle, of the guide vanes to change, thereby increasing engine efficiency, whilst avoiding complex mechanical arrangements for rotating the vanes. The invention permits more sophisticated changes in inclination, or angle, of the guide vanes to be achieved, and enables this to be controlled as required. Avoiding complex rotational arrangements, provides for weight savings and reliable operation.

It is to be realised that a wide range of further modifications may be made without departing from the scope of the invention. For instance various combinations of the above described embodiments could be used.

The present invention is applicable to a variable guide vane assembly for a compressor of a gas turbine engine or a turbine of a gas turbine engine.

The present invention provides a plurality of circumferentially spaced radially extending vanes provided radially between radially inner and radially outer rings.

I claim:

1. A variable guide vane assembly for a gas turbine engine having a center, the variable guide vane assembly comprising:
a plurality of elongated guide vanes disposed radially within the gas turbine engine relative to the center of the gas turbine engine, with at least some of the guide vanes configured such that when the conditions encountered by the guide vanes are positively varied, the angle of the guide vanes will alter, the guide vanes are made of layers of a composite material, with the layers of the composite material arranged in an asymmetric pattern relative to a mid plane of the guide vanes such that the guide vanes have asymmetric mechanical characteristics, and
a means for applying radial compression to the guide vanes such that the angle of the guide vanes will alter, wherein the guide vanes each defining side surfaces at opposing ends along the direction of elongation, the radial compression being applied along the entire length of one side surface of each guide vane.

2. The variable guide vane assembly according to claim 1, wherein fibres in the respective layers of the composite material are provided in an asymmetric pattern.

3. The variable guide vane assembly according to claim 2, wherein the fibres in the respective layers are generally inclined relative to a longitudinal axis of the guide vane.

4. A vane assembly according to claim 2, wherein the layers of composite material are inclined relative to the width of the guide vanes.

5. The variable guide vane assemble according to claim 1, wherein some of the layers in the composite material only extend for part of the length of the guide vane.

6. The variable guide vane assembly according to claim 1, wherein:
the guide vanes are made of an organic matrix composite; metal matrix composite; ceramic matrix composite; laminate with layers of different materials; metallic material with sections of different metals; or a prestressed metal.

7. The variable guide vane assembly according to claim 1, wherein the variable guide vane assembly includes urging means for placing some of the guide vanes under radial compression.

8. The variable guide vane assembly according to claim 7, wherein the urging means comprises a force application means for directly physically placing each guide vane under radial compression.

9. The variable guide vane assembly according to claim 8, wherein the force application means includes a plurality of individual piston and cylinder units.

10. The variable guide vane assembly according to claim 7, wherein the urging means includes shape memory alloy wires within the guide vanes such that to actuate the urging means, an electric current is supplied to the shape memory alloy wires causing the wires to heat, and when the actuation temperature is reached, a radial compression force is applied to the guide vanes.

11. The variable guide vane assembly according to claim 1, wherein inner and outer mounting rings are provided between which the vanes extend, and one or both of the mounting rings are provided with a significantly different thermal coefficient of expansion than the guide vanes, such that the heating up of the rings and guide vanes will cause radial compression force to be applied to the guide vanes, causing the angle of the guide vanes to vary.

12. The variable guide vane assembly according to claim 1, wherein inner and outer mounting rings are provided between which the guide vanes extend, and only a central portion of the guide vanes is mounted to the rings, with a leading and trailing edge of the guide vanes being clear of the rings.

13. The variable guide vane assembly according to claim 1, wherein the guide vanes have asymmetric thermal mechanical characteristics.

14. The variable guide vane assembly according to claim 1, wherein one or more heating means are provided in the guide vanes, such that actuation of the heating means causes the angle of the guide vanes to alter.

15. The variable guide vane assembly according to claim 14, wherein the heating means are provided only in a selected portion of the guide vanes.

16. The variable guide vane assembly according to claim 14, wherein the heating means includes heating wires embedded in the guide vanes.

17. The variable guide vane assembly according to claim 1, wherein the guide vanes are configured such that they can snap-through between two varied stress angles, and will remain in a one of the varied angles until sufficient respective forces are applied to urge the guide vanes to the other angle.

18. The variable guide vane assembly according to claim 17, wherein the guide vanes each include a central stressed core which provides a snap-through characteristic for the guide vanes, the central stressed core of each guide vane being arranged at a mid chord of the respective guide vane, arranged at a mid plane of the guide vane, and arranged between layers of composite material.

19. A vane assembly according to claim 18, wherein the central stressed core of each guide vane comprises a rod, or set of fibres, arranged at the mid chord of the vane, and a residual stress exists in the composite material with a compression force on both sides of the chord.

20. The variable guide vane assembly according to claim 17, wherein the guide vanes are arranged such that the force required to move the guide vanes to another angle can be provided in use by gas pressure loading in a compressor.

21. The variable guide vane assembly according to claim 1, wherein the guide vanes are outlet guide vanes.

22. The variable guide vane assembly as claimed in claim 1, wherein the guide vane assembly is arranged in a compressor of the gas turbine engine.

23. The variable guide vane assembly as claimed in claim 1, wherein the guide vane assembly is arranged in a turbine of the gas turbine engine.

24. A variable guide vane assembly for a gas turbine engine having a center, comprising:
a plurality of elongated guide vanes disposed radially within the gas turbine engine relative to the center of the gas turbine engine, each guide vane having a center and a side surface, the guide vanes being made of layers of a composite material arranged in an asymmetric pattern relative to a plane extending through the center of each guide vane, and
an actuator that applies radial compression to the guide vanes to adjust the angle of the guide vanes, wherein the guide vanes each defining side surfaces at opposing ends along the direction of elongation, the radial compression being applied along the entire length of one side surface of each guide vane.

25. A variable guide vane assembly for a gas turbine engine having a center, the variable guide vane assembly comprising:
a plurality of elongated guide vanes disposed radially within the gas turbine engine relative to the center of the gas turbine engine, with at least some of the guide vanes configured such that when the conditions encountered by the guide vanes are positively varied, the angle of the guide vanes will alter, the guide vanes are made of layers of a composite material, with the layers of the composite material arranged in an asymmetric pattern relative to a mid plane of the guide vanes such that the guide vanes have asymmetric mechanical characteristics, and
a means for applying radial compression to the guide vanes such that the angle of the guide vanes will alter, wherein
some of the layers in the composite material only extend for part of the length of the guide vane, and
some of the layers of the composite material extend wholly across the guide vanes in a shallow S configuration and others of the layers of composite material extend only part of the length thereof from the edge towards the centre of the guide vanes.

26. A variable guide vane assembly for a gas turbine engine, the variable guide vane assembly comprising:
a plurality of vanes, with at least some of the vanes configured such that when conditions encountered by the guide vanes are positively varied, the angle of the guide vanes will alter, the guide vanes are made of layers of a composite material, with the layers of the composite material arranged in an asymmetric pattern relative to a mid plane of the guide vanes such that the vanes have asymmetric mechanical characteristics, wherein
the guide vanes are configured such that they can snap-through between two varied stress angles,
the guide vanes will remain in one of the varied angles until sufficient respective forces are applied to urge the guide vanes to the other angle, and
some of the layers of the composite material extend wholly across the guide vanes in a shallow S configuration and others of the layers of composite material extend only part of the length thereof from the edge towards the centre of the guide vanes.

* * * * *